United States Patent
Tiesler et al.

[11] Patent Number: 6,045,173
[45] Date of Patent: Apr. 4, 2000

[54] CONSOLE WITH MULTI-POSITION COVER

[75] Inventors: Roy Frank Tiesler, Troy; Peter Andrew Lawlis, Pleasant Ridge; Arthur Edward Pryde, West Bloomfield, all of Mich.

[73] Assignee: General Motors Corporation, Detroit, Mich.

[21] Appl. No.: 08/987,845

[22] Filed: Dec. 9, 1997

[51] Int. Cl.$^7$ ............................................. B60N 3/10
[52] U.S. Cl. .................... 296/37.8; 224/282; 224/539; 224/926; 248/311.2; 297/188.14; 297/188.19; 220/813; 296/153
[58] Field of Search .................... 296/37.1, 37.8, 296/158; 220/523, 525, 812, 813, 835; 224/282, 539, 542, 926; 248/118, 118.5, 311.2; 297/188.14, 188.19

[56] References Cited

U.S. PATENT DOCUMENTS

| | | | |
|---|---|---|---|
| 2,338,477 | 1/1944 | Wolters et al. | 312/189 |
| 2,532,830 | 12/1950 | Barnhart et al. | 108/2 |
| 2,569,254 | 9/1951 | Page | 312/272 |
| 2,678,682 | 5/1954 | Thomas | 155/112 |
| 2,758,744 | 8/1956 | Spindler | 220/38 |
| 3,490,642 | 1/1970 | Friedlander | 220/38 |
| 3,873,010 | 3/1975 | Patterson | 224/42 |
| 4,146,159 | 3/1979 | Hemmen | 224/275 |
| 4,521,056 | 6/1985 | Lindenmuth | 297/412 |
| 4,615,461 | 10/1986 | Liu | 220/331 |
| 4,685,729 | 8/1987 | Heesch et al. | 297/193 |
| 4,934,750 | 6/1990 | Eichler et al. | 296/37.8 |
| 5,018,633 | 5/1991 | Toth et al. | 248/311.2 |
| 5,076,641 | 12/1991 | Lindberg | 297/194 |
| 5,085,481 | 2/1992 | Fluharty et al. | 296/37.8 |
| 5,096,152 | 3/1992 | Christiansen et al. | 248/311.2 |
| 5,104,184 | 4/1992 | Kwasnik et al. | 297/194 |
| 5,106,143 | 4/1992 | Soeters | 296/37.8 |
| 5,131,716 | 7/1992 | Kwasnik et al. | 297/194 |
| 5,232,190 | 8/1993 | Gould | 248/311.2 |
| 5,284,314 | 2/1994 | Misaras et al. | 248/311.2 |
| 5,316,368 | 5/1994 | Arbisi | 297/194 |
| 5,330,146 | 7/1994 | Spykerman | 248/311.2 |
| 5,338,081 | 8/1994 | Young et al. | 296/37.14 |
| 5,390,976 | 2/1995 | Doughty et al. | 297/115 |
| 5,397,160 | 3/1995 | Landry | 296/37.8 |
| 5,562,331 | 10/1996 | Spykerman et al. | 297/188.16 |
| 5,845,965 | 12/1998 | Heath et al. | 297/188.19 |
| 5,863,089 | 1/1999 | Ignarra et al. | 296/37.8 |
| 5,876,007 | 3/1999 | Lancaster et al. | 248/311.2 |

FOREIGN PATENT DOCUMENTS 405193417  8/1993  Japan ................................ 224/926

*Primary Examiner*—Stephen T. Gordon
*Assistant Examiner*—Paul Chenevert
*Attorney, Agent, or Firm*—Kathryn A. Marra

[57] ABSTRACT

A vehicle console includes an enclosure having a top defining an access opening communicating with an internal storage bin and a cupholder recess spaced forward of the access opening. A cover mounted on the enclosure has three operating positions including a closed position covering both the cupholder recess and the access opening, a partially open position exposing the cupholder recess for use but covering the access opening, and a fully open position uncovering both the cupholder recess and the access opening for access to the storage bin. The cover is mounted for slidable movement between the closed and partially open positions and for pivotal movement between the partially open and fully open positions.

14 Claims, 5 Drawing Sheets

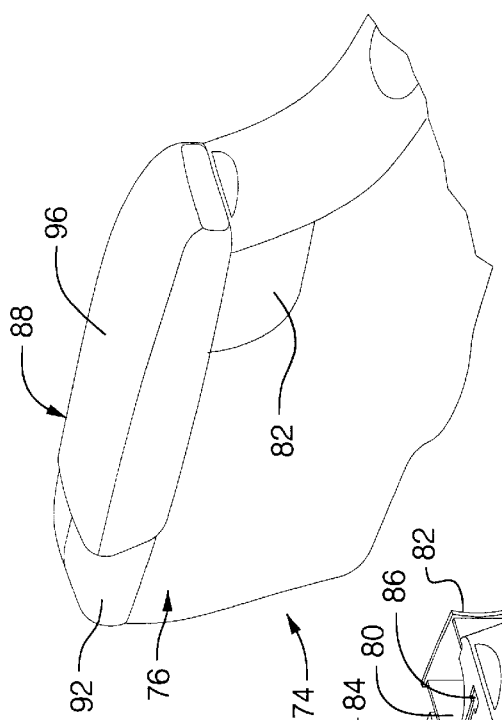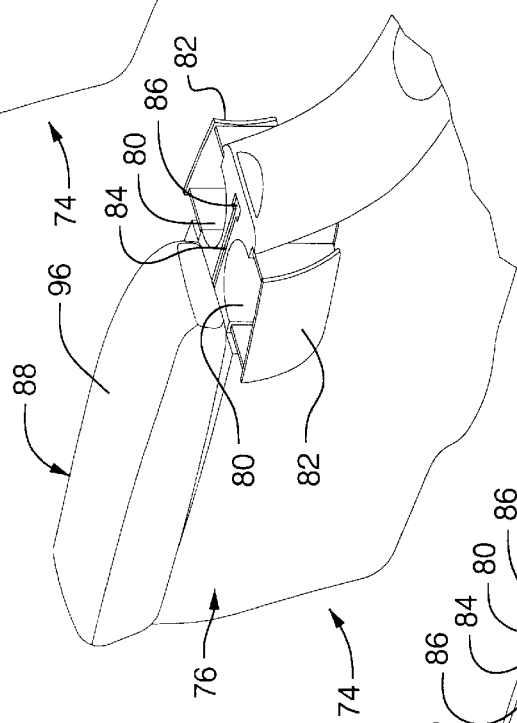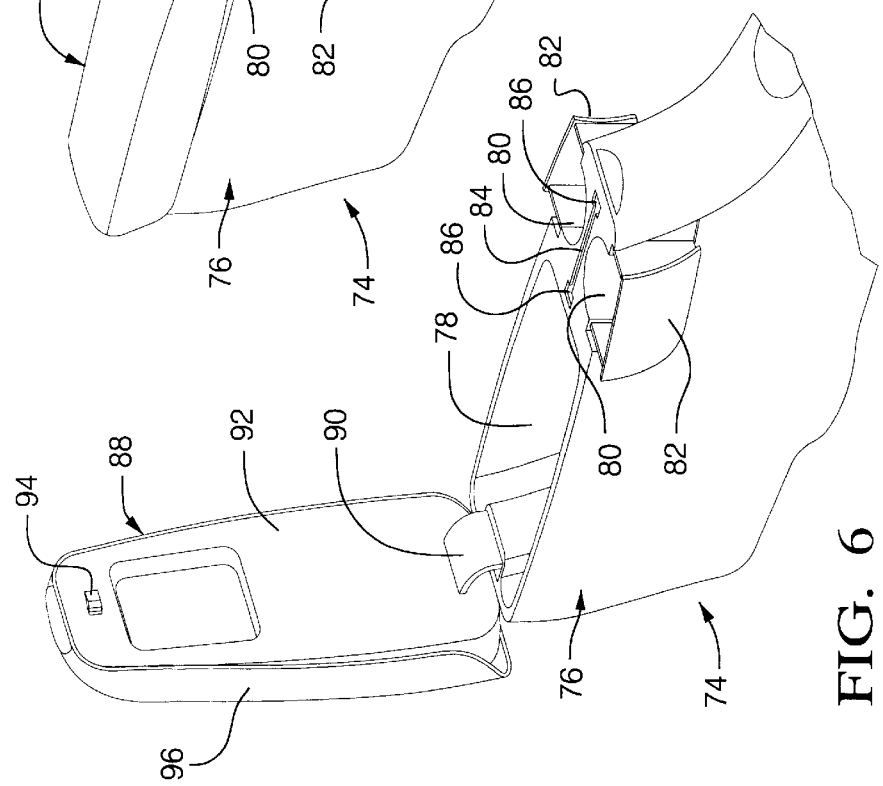

CONSOLE WITH MULTI-POSITION COVER

TECHNICAL FIELD

This invention relates to consoles for vehicle bodies and more particularly to a console with a multi-position sliding and tilting cover.

BACKGROUND OF THE INVENTION

It is known in the art relating to automotive vehicles to provide a console located between bucket-type seats for the storage of articles and, in some cases, to provide a cupholder. The cover of the console generally acts as an armrest. The console covers commonly tilt back or sideways to uncover the storage recess. A cupholder may be incorporated in this recess or may be mounted in semi-collapsed form and pulled out of the recess for use with the cover in closed position.

SUMMARY OF THE INVENTION

The present invention provides a console with a multi-position cover which acts as an armrest with the cover closed or in a partially open position. From the closed position, the cover slides rearward to the partially open position, uncovering one or more cupholder recesses. To access a storage receptacle in the console, the cover may be tilted upward from the partially open to a fully open position wherein the cover is standing in a vertical or near vertical position, tilted upward on a hinge device. Dual cupholder recesses may be provided with expansion drawers openable to size the cupholders for use.

These and other features and advantages of the invention will be more fully understood from the following description of certain specific embodiments of the invention taken together with the accompanying drawings.

BRIEF DESCRIPTION OF THE DRAWINGS

In the drawings:

FIGS. 6, 7 and 8 are pictorial views of an alternative embodiment of console with the cover shown, respectively, in fully open, partially open and closed positions.

DESCRIPTION OF THE PREFERRED EMBODIMENTS

Figure 1:
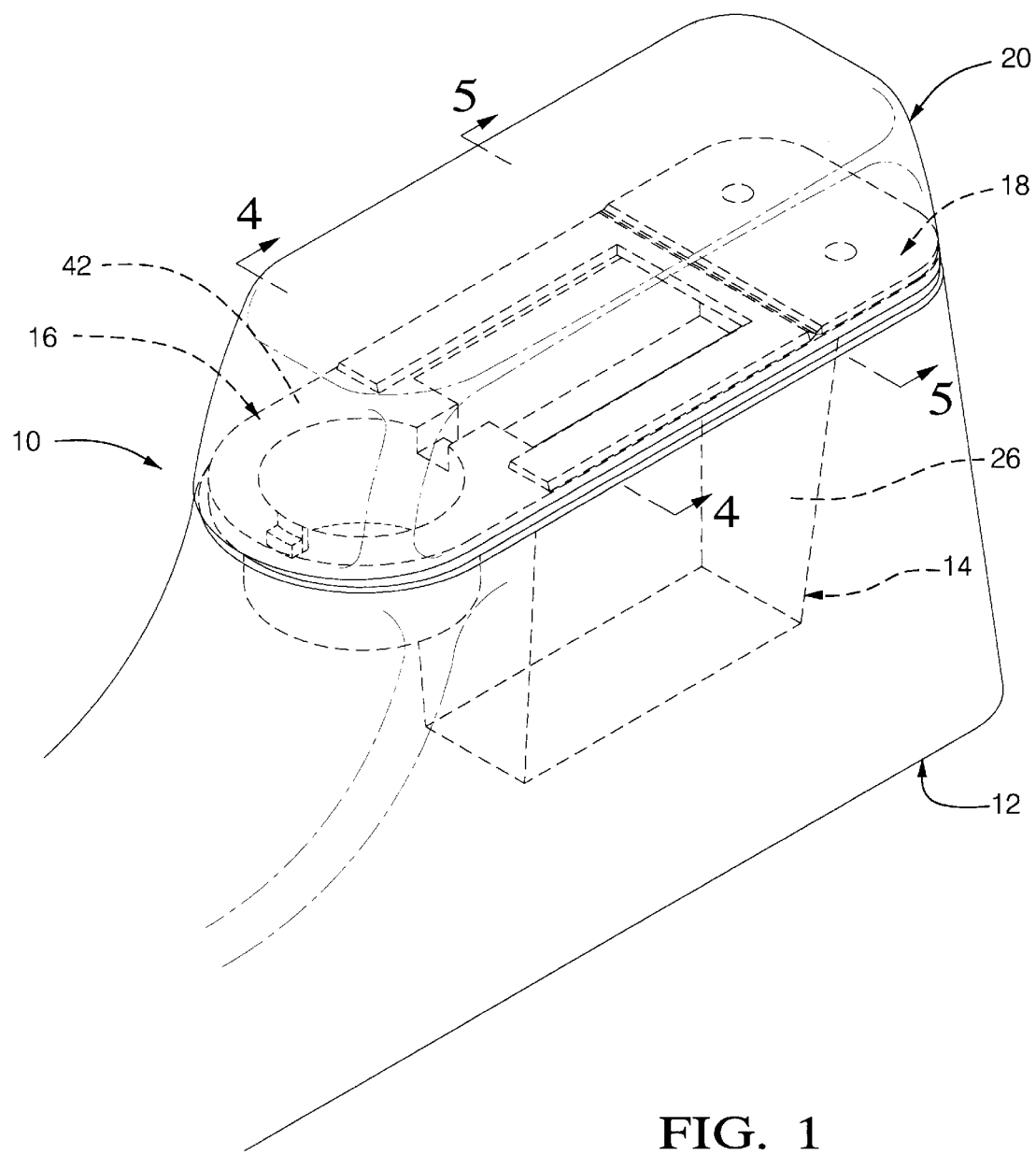
FIG. 1 is a pictorial view of a first embodiment of a console having a cover shown in the closed position.

Referring first to FIGS. 1–5 of the drawings in detail, numeral 10 generally indicates a console such as may be mounted between front seats of an automotive vehicle. Console 10 includes a body 12, a bin structure 14, a body ring 16, a sliding hinge 18 and a cover 20. All these elements may be conventionally made of suitable plastics or other material as desired.

The body 12 is adapted to be mounted in a convenient place adjacent to a seat of the vehicle, such as on the compartment floor between spaced front bucket seats for a driver and passenger. The body 12 is formed as a molded outer housing or enclosure having an upper edge with an inwardly projecting stiffening rib 22 defining an upwardly facing opening 24.

The bin structure 14 includes walls defining an upwardly opening bin or receptacle 26. A flange 28 extends outward from the upper edges of the bin 26 with a downwardly extending rim 30 around its outer edge. Longitudinal ribs 32 extend upwardly along either side of the flange 28 intermediate its ends and closely adjacent to the rim 30 of the bin structure 14. A rearward portion of the flange 28 is raised to form a deck 34 while a forward portion of the flange 28 defines a rim 36 surrounding an opening 38. The bin structure 14 is installed within the body 12 through an open bottom, not shown, with the rim 30 engaging the interior of the side walls of the body 12 and the ribs 32 located adjacent the ribs 22 of the body. The bin structure 14 may be supported in the body 12 by through-fasteners, not shown, extending through the body side walls into the rim 30. Other supporting means may be used if desired.

The body ring 16 includes inner depending walls 40 which, in assembly, extend downward into contact with the walls of the bin 26 to define an access opening into the bin 26. Walls 40 connect upwardly with an upper deck 42 which seats, in its rearward portion, against the deck 34 of the bin structure 14. The outer edges of deck 42 join downwardly extending walls 44 which seat downwardly against a rim 46 of the body 12. Slots 48 are provided in the upper deck 42 intermediate its ends and extending longitudinally between the opening defining walls 40 and the outer walls 44. At a forward end of the upper deck 42, a cupholder recess 50 is formed which, in assembly, extends down through the opening 38 in the bin structure 14. A slot 52 is formed between the recess 50 and the bin opening defined by walls 40, and a catch recess 54 is located at the forward end of the cupholder recess 50.

The sliding hinge 18 includes a flat U-shaped slide 56 having at its forward end depending retainers 58. These retainers 58 each include a vertical wall 60 integral with the slide 56 and extending downward through the slot 48 of the body ring 16 into a space between the upper deck 42 and the flange 28 of the bin structure 14. Walls 60 connect adjacent their lower ends with outwardly flexing legs 62 which are connected with the walls 60 by living hinge connectors of relatively thin and flexible plastic. These legs 62 are flattened against the walls 60 for sliding through the slots 48 when installing the sliding hinge 18 on the body ring 16. At the rear end of the slide 56, a living hinge connects the slide 56 with a hinge leaf 64 having a pair of fastener openings 66 therethrough. Fasteners, not shown, extend in assembly through openings 66 to attach the cover 20 to the hinge leaf 64.

The cover 20 is formed with a plastic foam core 68 surrounded by a decorative flexible skin 70. Attachment means, not shown, are formed within the cover 20 for receiving the fasteners by which the cover 20 is attached to the hinge leaf 64. A tab 72 extends from the front lower edge of the cover 20.

In use, the cover 20 is normally usable as an arm rest and positioned in a forward closed position as shown in FIG. 1. When it is desired to use the cupholder recess 50 for holding a cup, the cover 20 may be slid rearwardly to a partially open position "A" shown by phantom lines in FIG. 2. In this position, the sliding hinge 18 has been moved rearward, retained by the retainers 58 through the slots 48, to the position "A" where the cupholder recess 50 is exposed for use while the storage bin or receptacle 26 remains covered. The tab 72 on the cover 20 then resides in the slot 52 of the body ring 16 to frictionally retain the cover 20 in this rearward, partially open position.

Figure 2:
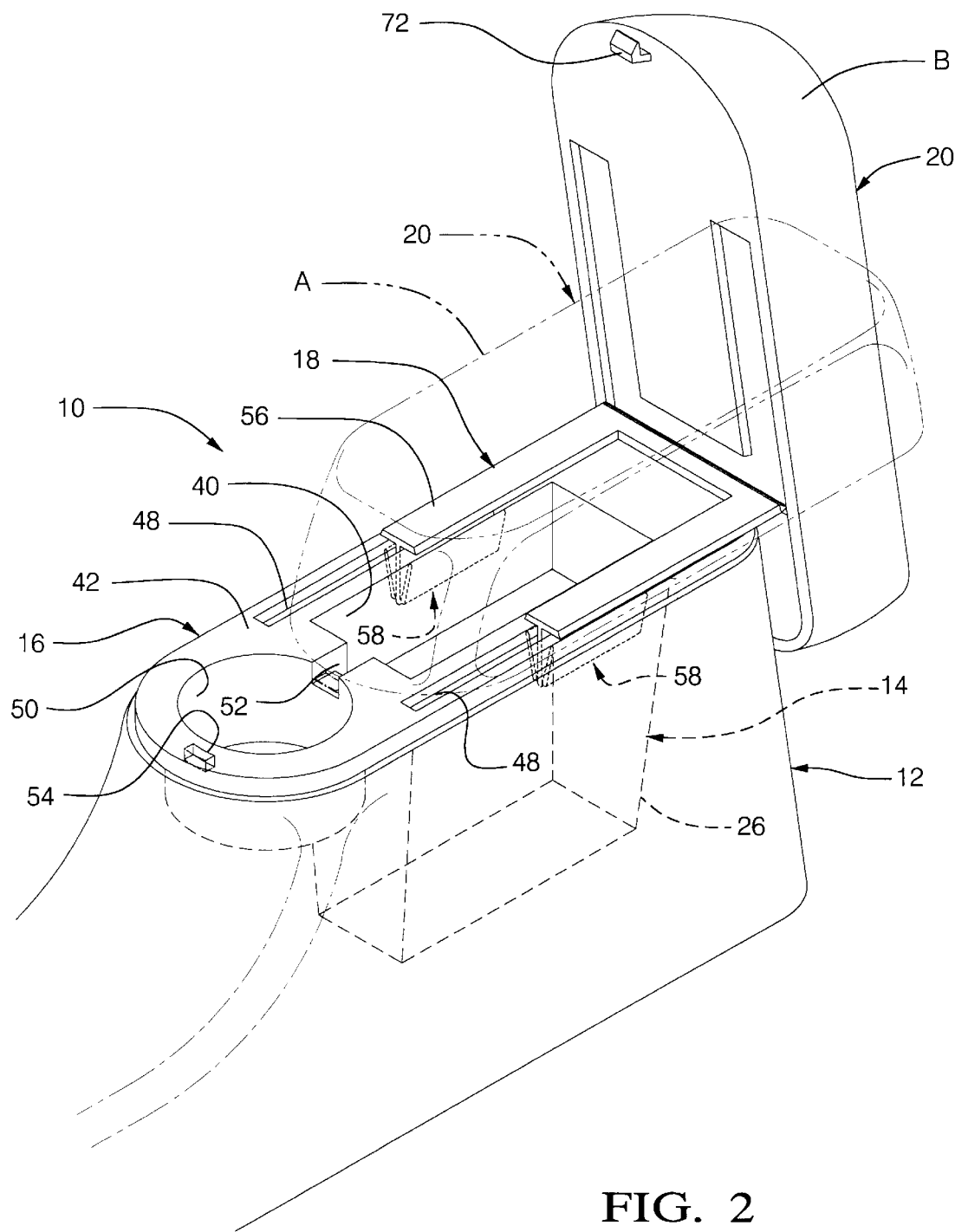
FIG. 2 is a pictorial view showing two alternate open positions of the console.
Figure 3:
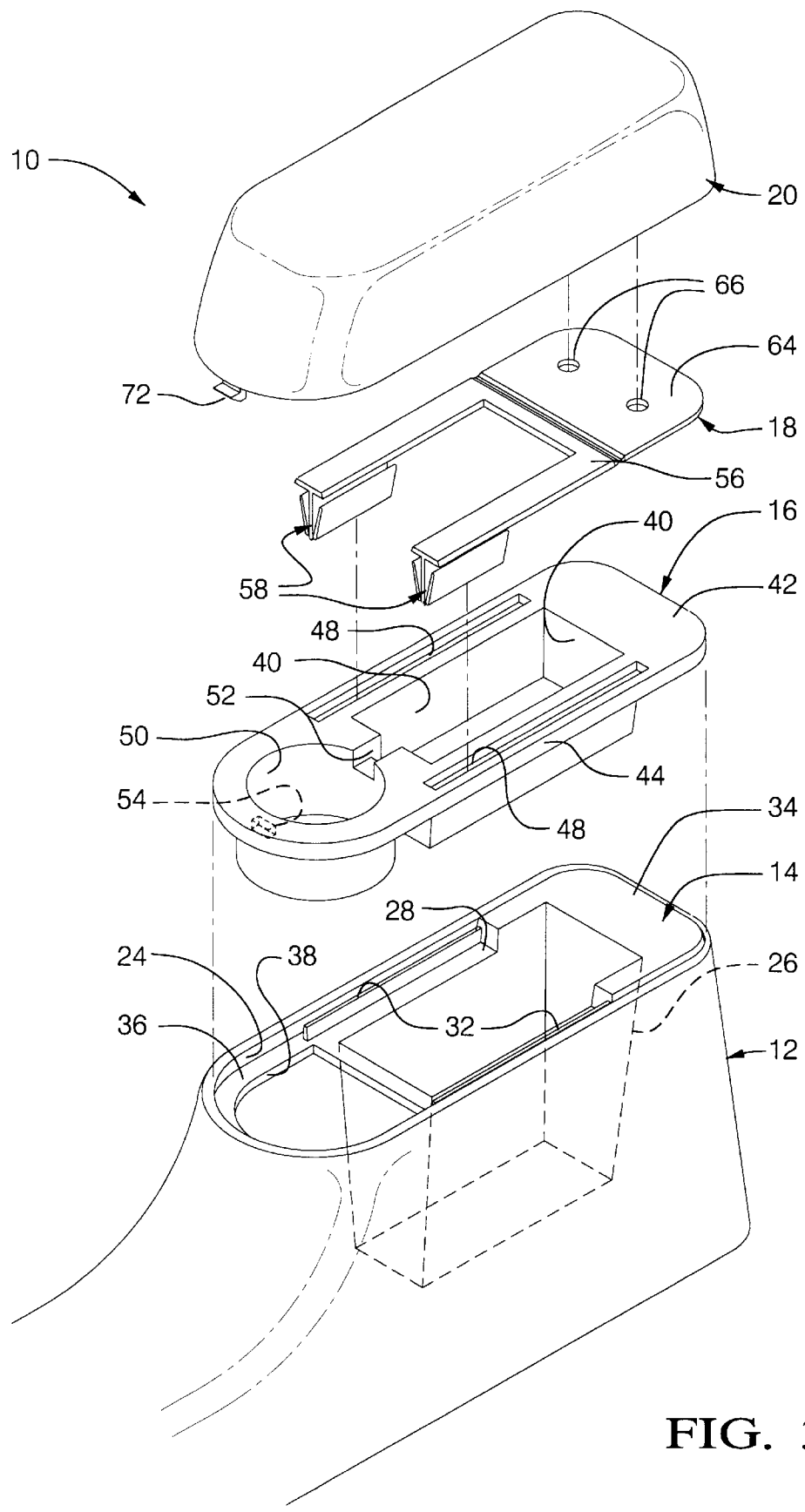
FIG. 3 is an exploded pictorial view showing the elements of the console.
Figure 4:
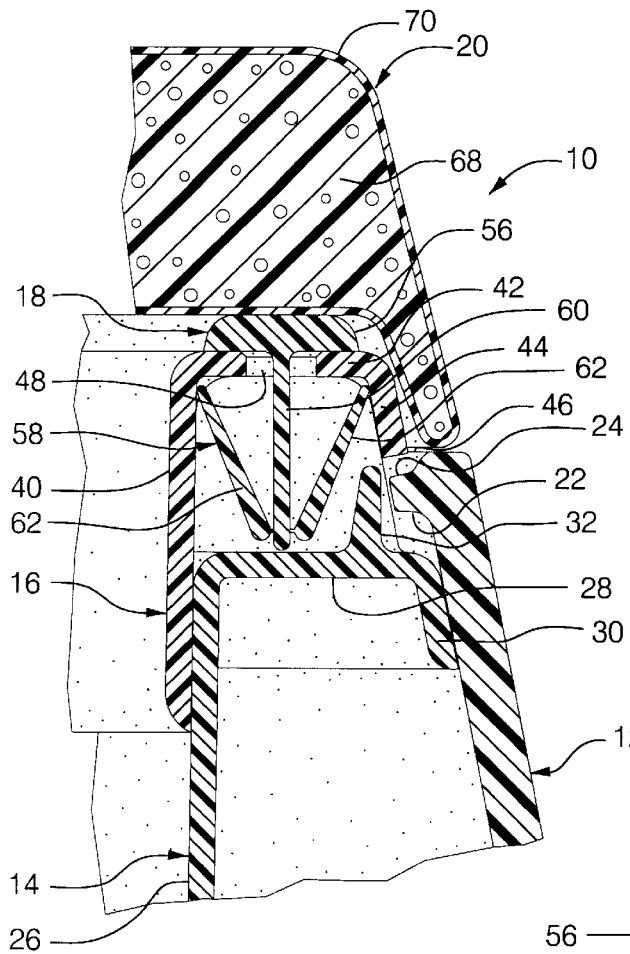
FIGS. 4 and 5 are fragmentary cross-sectional views from the lines 4—4 and 5—5, respectively, of FIG. 1.
Figure 5:
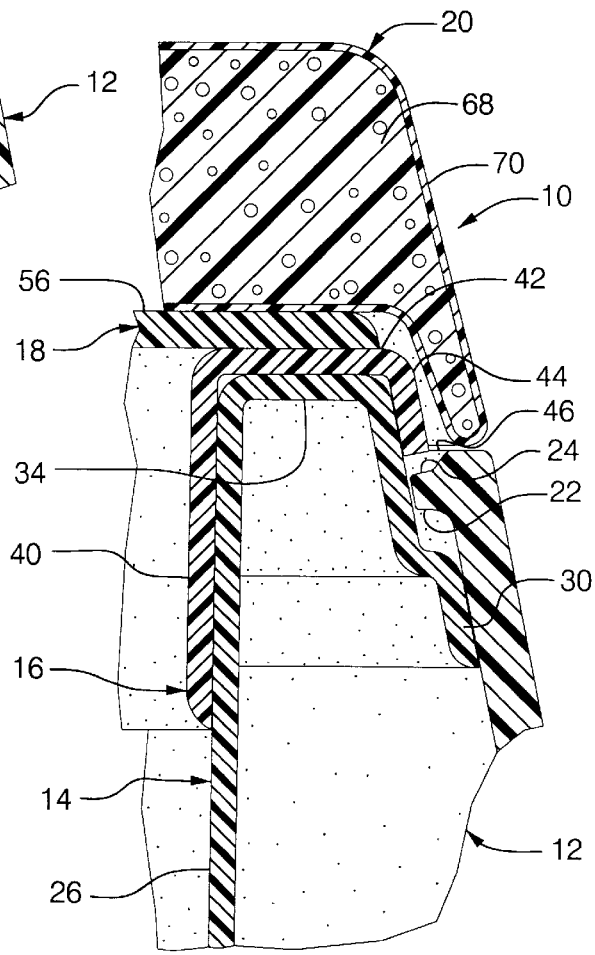

When it is desired to uncover the storage bin 26, the cover 20 may be tilted upward to a position "B" approaching a vertical orientation as shown in solid lines in FIG. 2. To accomplish this, the hinge leaf 64 is pivoted on the living hinge which integrally connects it with the slide 56 of the sliding hinge 18.

To close the console, the cover 20 is first tilted downward to the partially open position "A" which covers the storage bin 26 and, if the cupholder recess 50 is no longer needed, the cover 20 may be slid forward to the fully closed position shown in FIG. 1. In this position, the tab 72 engages the catch recess 54 in the forward portion of the cupholder recess 50 to frictionally retain the cover 20 in the fully closed position. Note that the cover 20 may be used as an arm rest in either the closed position of FIG. 1 or the partially open position of FIG. 2.

Referring now to FIGS. 6–8 an alternative embodiment of console 74 is illustrated. This console 74 includes a molded body 76 internally defining a storage bin 78. At its forward end, ahead of the bin 78, the body 76 has side cupholder recesses 80 fitted with drawers 82 which, when pulled outward, define cupholders in cooperation with the recesses 80. A slot 84 is provided in a deck portion between the recesses 80 and includes enlarged openings 86 at its forward and rearward ends.

A two piece cover 88 is pivotally mounted to the body 76 by a rearwardly pivoting hinge 90. The hinge 90 connects with an inner member 92 of the cover 88 which includes near its forward end a downwardly protruding tab 94. The cover 88 includes an outer member 96 which partially encloses and is slidable on the inner member 92 into forward and back positions.

In use, FIG. 6 illustrates the console 74 with the cover 88 raised, exposing the storage bin 78, and with the drawers 82 pulled out to form dual cupholders. To cover the storage bin 78, the cover 88 is pivoted downward to a partially closed position shown in FIG. 7, wherein the cupholders remain usable and the cover 88 may act as an armrest. When the cupholders are no longer needed, drawers 82 may be closed to provide a smooth walled side merging with the body 76, and the outer member 96 of the cover 88 may be slid forward to cover the cupholder recesses 80 so that the console cover 88 is fully closed as shown in FIG. 8.

To keep the cover 88 closed, a friction or snap retainer, not shown, may be engaged between the inner and outer cover members 92, 96. Alternatively, the outer member 96 may be modified to surround the forward end of the inner member 92 so that the tab 94 extends downward from the forward end of the outer member 96. Then, when the cover 88 is closed to the partially open position of FIG. 7, the tab 94 enters the rear enlarged opening 86 of the slot 84 where it frictionally retains the outer member 96 in its rearward position. However, outer member 96 may be slid forward, the tab 94 passing through the slot 84 to the forward enlarged opening 86 where the tab 94 acts to frictionally retain the outer member 96 in the forward, fully closed position of the cover 88. It should be apparent that with this alternative construction, the cover may be pivoted open with the outer member 96 in either the forward position of FIG. 8 or the rearward position of FIG. 7, since this is permitted by the two enlarged openings 86 at either end of the slot 84.

The illustrated embodiments both show a cover hinge 64, 90 located adjacent a rear side of the console body 12, 76 for tilting the cover 20, 88 upward and backward for access to the storage bin 26, 78. However, it should be apparent that either cover arrangement could be hinged on one of the lateral sides instead of the rear side and still provide the combined sliding and tilting action described for partially or fully opening the cover.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A vehicle console including:
   an enclosure having a top defining an access opening communicating with an internal storage bin and a cupholder recess spaced forward of the access opening; and
   a cover mounted on said enclosure and having three operating positions including a closed position covering both the cupholder recess and the access opening, a partially open position exposing the cupholder recess for use but covering the access opening and a fully open position uncovering both the cupholder recess and the access opening for access to the storage bin;
   wherein said cover is mounted for slidable movement between said closed and partially open positions and for pivotal movement between said partially open and fully open positions.

2. A vehicle console including:
   an enclosure having a top defining an access opening communicating with an internal storage bin and a cupholder recess spaced forward of the access opening; and
   a cover mounted on said enclosure and having three operating positions including a closed position covering both the cupholder recess and the access opening, a partially open position exposing the cupholder recess for use but covering the access opening and a fully open position uncovering both the cupholder recess and the access opening for access to the storage bin;
   wherein said cover is mounted for slidable movement between said closed and partially open positions and for pivotal movement between said partially open and fully open positions;
   said cover being hinged to a slide that is slidably movable between a first position wherein said cover is in said fully closed position and a second position wherein said cover may be pivoted between said partially open position and said fully open position.

3. A vehicle console including:
   an enclosure having a top defining an access opening communicating with an internal storage bin and a cupholder recess spaced forward of the access opening; and
   a cover mounted on said enclosure and having three operating positions including a closed position covering both the cupholder recess and the access opening, a partially open position exposing the cupholder recess for use but covering the access opening and a fully open position uncovering both the cupholder recess and the access opening for access to the storage bin;
   wherein said cover is mounted for slidable movement between said closed and partially open positions and for pivotal movement between said partially open and fully open positions;

said cover being hinged to a slide that is slidably movable between a first position wherein said cover is in said fully closed position and a second position wherein said cover may be pivoted between said partially open position and said fully open position;

said slide being pivotally connected with a hinge leaf that is fixed to said cover, said slide formed in a U shape having parallel legs joined at one end and having a space between the legs that allows full access to the access opening when the slide is in said second position and the cover is fully open, said legs including retainers received in retainer slots in said enclosure adjacent to and on opposite sides of the access opening, the retainers being movable in said retainer slots for movement between the first and second positions and retaining the cover on said enclosure in all of said cover positions.

4. A vehicle console as in claim 3 wherein said cupholder recess, said access opening and said retainer slots are formed in a body insert mountable on a support body in which said storage bin is enclosed.

5. A vehicle console as in claim 4 wherein said cover includes a tab that is engagable with a catch recess in the cupholder recess for releasably retaining the cover in said fully closed position, said tab being also engagable with a slot between said cupholder recess and said access opening for releasably retaining said cover in said partially open position.

6. A vehicle console as in claim 1 wherein said cover is capable of use as an armrest in said closed and said partially open positions.

7. A vehicle console as in claim 1 wherein said cover includes an inner member and an outer member;

said inner member being pivotally mounted to said enclosure adjacent a side of said access opening for pivotal movement between said partially open position, wherein the inner member covers the access opening, and said open position, wherein the inner member is upstanding to uncover the access opening;

said outer member being slidably mounted on said inner member for movement between said closed position, wherein said outer member covers the cupholder recess, and said partially open position, wherein said cupholder recess is uncovered.

8. A vehicle console as in claim 7 wherein said inner member is pivotally mounted adjacent a rear side of said access opening so that the inner and outer members pivot together about said rear side.

9. A vehicle console as in claim 7 wherein a second cupholder recess is defined adjacent said first named cupholder recess in the top of said enclosure and said outer member covers both of the cupholder recesses in said closed position.

10. A vehicle console as in claim 9 wherein said cupholder recesses are positioned in side by side relation.

11. A vehicle console as in claim 10 wherein said adjacent cupholder recesses are narrower than required for holding cups in order to fit said recesses within said enclosure top, said enclosure including pull out drawers outwardly adjacent to said cupholder recesses on opposite sides of said enclosure and movable between inner positions, wherein the drawers are flush with said sides of the enclosure, and outer positions, wherein the cupholder recesses are enlarged sufficiently for cup holding use.

12. A vehicle console as in claim 7 wherein one of said cover members includes a tab receivable in an opening in the top of said enclosure for releasably retaining the cover in one of said closed and partially open positions.

13. A vehicle console as in claim 3 wherein said cover is capable of use as an armrest in said closed and said partially open positions.

14. A vehicle console as in claim 7 wherein said cover is capable of use as an armrest in said closed and said partially open positions.

\* \* \* \* \*